United States Patent [19]

Schmiesing

[11] 4,070,991
[45] Jan. 31, 1978

[54] FEED BUNK STRUCTURE

[76] Inventor: Gregory Schmiesing, R.R. No. 1, New Bremen, Ohio 45869

[21] Appl. No.: 691,201

[22] Filed: May 28, 1976

Related U.S. Application Data

[63] Continuation of Ser. No. 554,187, Feb. 28, 1975, abandoned.

[51] Int. Cl.$^2$ ............................................. A01K 5/00
[52] U.S. Cl. ........................................ 119/58; 119/61
[58] Field of Search ................... 119/52 B, 56 R, 58, 119/61, 59, 60, 52 AF; 249/146

[56] References Cited

U.S. PATENT DOCUMENTS

| | | | |
|---|---|---|---|
| 247,917 | 10/1881 | Irwin | 119/58 |
| 390,667 | 10/1888 | Hall | 119/58 |
| 3,306,261 | 2/1967 | Purdy | 119/52 B X |
| 3,476,352 | 11/1969 | Bunger | 119/61 X |
| 3,543,728 | 12/1970 | Buschbom | 119/56 R X |
| 3,695,234 | 10/1972 | Buschbom et al. | 119/52 B |

Primary Examiner—Hugh R. Chamblee
Attorney, Agent, or Firm—Jerome P. Bloom

[57] ABSTRACT

An improved feed bunk assembly embodying a portable superstructure which can be quickly and easily assembled or disassembled as needs require. In a preferred embodiment the superstructure includes load supporting post means which may be slip fit in feed bunk apertures and thereby stabilized. The invention further contemplates that the feed bunk may mount a longitudinally oriented device which may be employed to introduce feed of selectively different types into one side of a feed bunk or the other.

19 Claims, 12 Drawing Figures

U.S. Patent　Jan. 31, 1978　Sheet 1 of 3　4,070,991
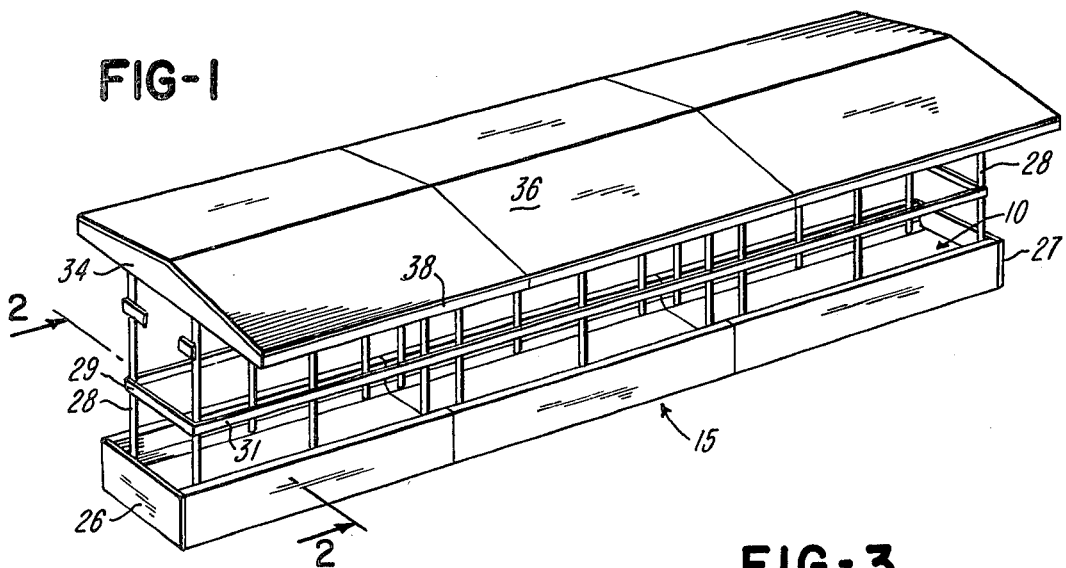
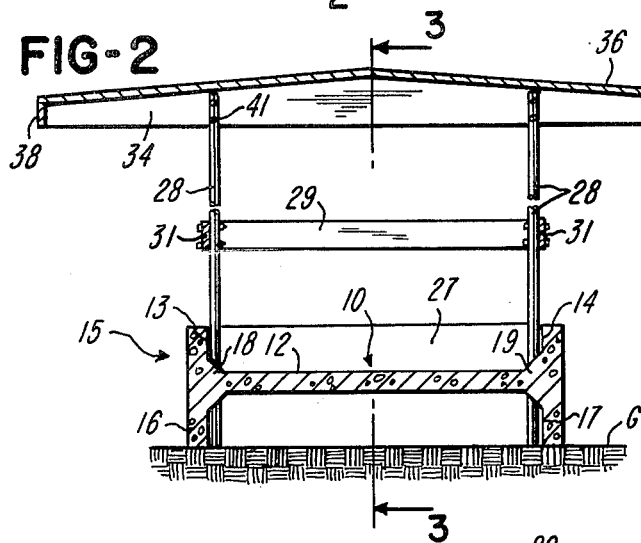
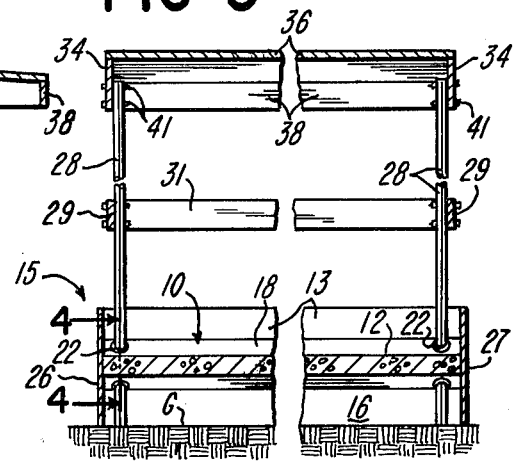
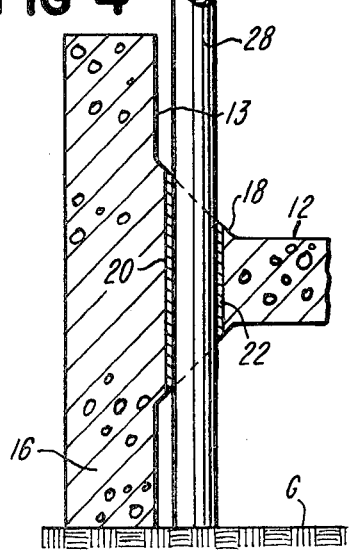
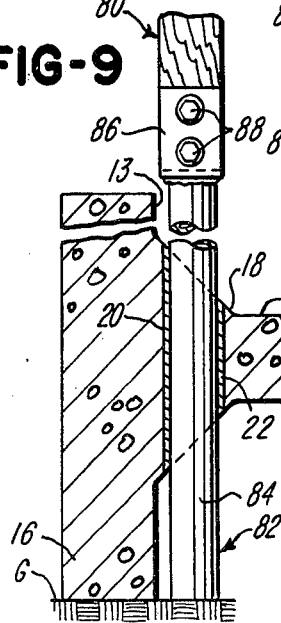
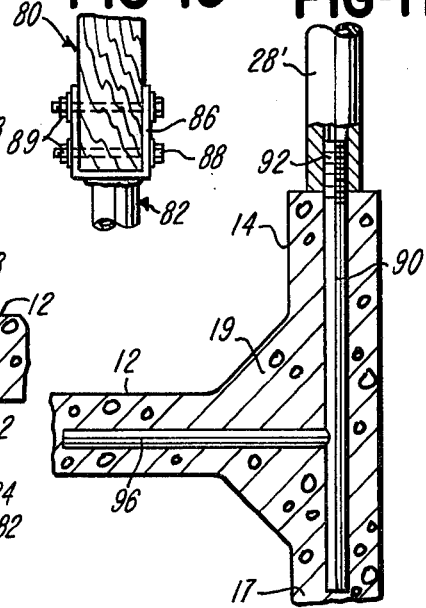

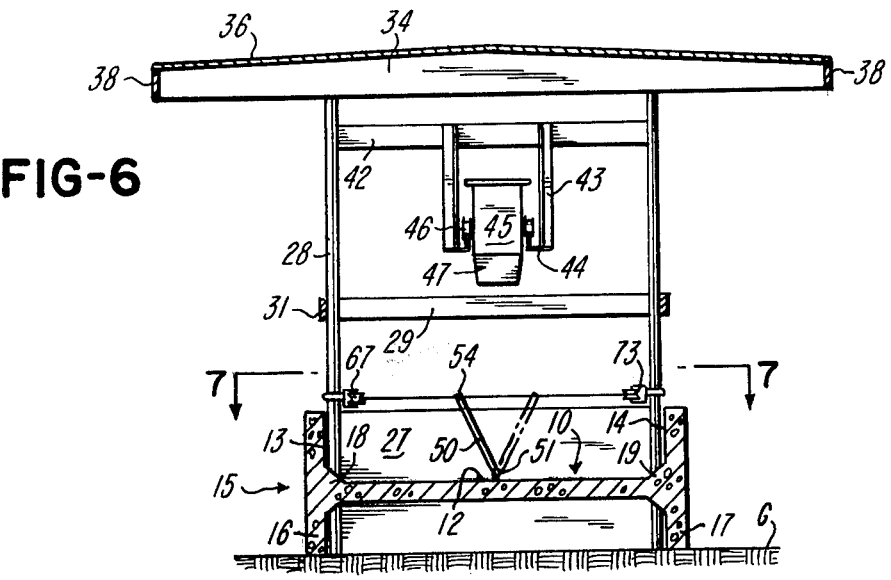
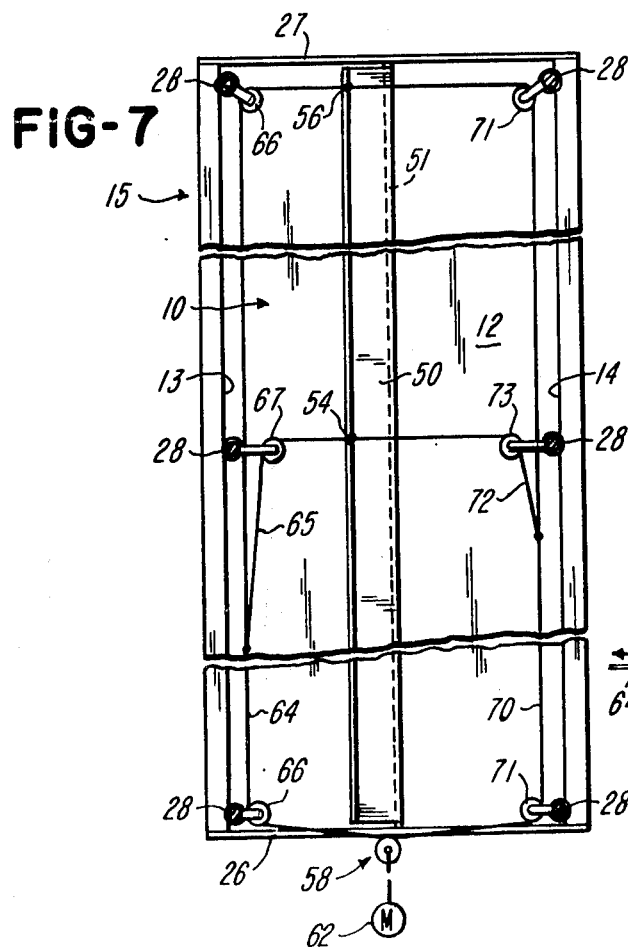
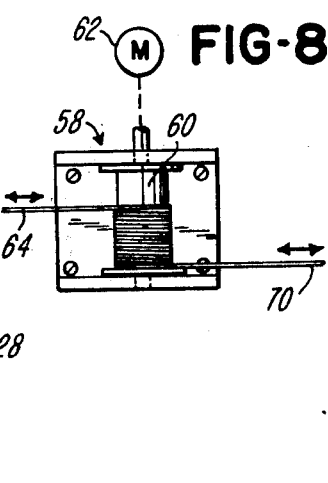

FEED BUNK STRUCTURE

This application is a continuation of applicant's presently pending application Ser. No. 554,187 for U.S. Patent entitled "FEED BUNK STRUCTURE" which was filed Feb. 28, 1975, now abandoned.

BACKGROUND OF THE INVENTION

Farmers with livestock, feed lot operators and the like make frequent use of feed bunks. These are troughs or mangers which in one commonly seen form are made in pre-cast concrete units. These are used singly or placed in end to end relation and in many cases provided with a permanently connected superstructure which sometimes mounts an overhead feeder. In some instances the feed bunk includes fixed partitions which enables animals to feed on both sides of the bunk without interference from one side to the other.

Where a goodly number of animals must be fed, it has been a common practice to construct a feed bunk with its superstructure as a permanent building. This oftentimes creates problems. The posts required to support the superstructure are frequently damaged by feeding animals. They also tend to deteriorate due to exposure to changing weather conditions. In either case, reconstruction or repair of the superstructure becomes a major project. Also, in many cases it becomes desirable that the feed bunk structure be changed as to its size, arrangement or location. With a fixed construction this is again a major and costly project. Another disadvantage found in prior art feed bunk assemblies is that the nature and placement of the posts used to support the superstructure interferes with the free movement of animals to their feed. Moreover, the cleaning blade of a tractor or other machine which one is frequently required to operate in the vicinity of the feed bunk will oftentimes hook to and damage its posts which are located outside of the bunk. These are primary reasons that the support posts are frequently damaged to the extent they must be replaced or repaired. The foregoing is apart from the fact that the prior art feed bunk does not lend itself to the ready introduction of different feed materials.

SUMMARY OF THE INVENTION

The present invention affords solutions to the above noted problems. In particular, it provides improvements in the nature and application of a feed bunk superstructure. In the various embodiments of the invention which are preferred the base supports for the superstructure are vertically oriented post means, portions of which are slip fit and releasably connected to mount in vertically projected relation to the feed bunk which forms its base. Preferred embodiments of the feed bunk are so constructed that the post means which serve as the base of its superstructure are mounted by way of means defining apertures or passages formed in or in connection with the feed bunk, in locations which are inset from its peripheral boundary. The post means may be unitary structures or formed in parts but they will in any case depend for their stable mount on their interaction with the improved structure of the basic feed bunk as contemplated by the present invention. The net effect of the structural package here provided is that the entire assembly is so designed that its components can be quickly and easily assembled or disassembled, as and when needs require.

A further and optional feature of the invention is the embodiment of a pivoted divider in the receptacle defined by the feed bunk, which divider is capable of being manipulated to selectively direct feed, dropped from an overhead conveyor, to a selected area within the boundary of the feed bunk. This facilitates a variety of feed being placed in a single feed bunk in a simple and highly effective manner.

It is accordingly a primary object of the invention to provide an improved feed bunk assembly which may be economically fabricated and installed, more efficient and satisfactory in use, adaptable to a wide variety of application and be less susceptible to damage by feeding animals.

Another object of the invention is to provide an improved means and method of mounting a superstructure to a basic feed bunk which lends ease of placement and relocation of the assembly so provided.

An additional object of the invention is to provide improvements in feed bunk structure facilitating the mount thereto of a superstructure.

A further object of the invention is to provide an improved feed bunk embodying adjustable divider means which facilitate the directing of a particular feed material to one part of a feed bunk or another.

An additional object of the invention is to provide a feed bunk assembly and components thereof possessing the advantageous structural features, the inherent meritorious characteristics and the means and mode of use herein described.

With the above and other incidental objects in view, as will more fully appear in the specification, the invention intended to be protected by Letter Patent consists of the features of construction, the parts and the combinations thereof, and the mode of operation as hereinafter described or illustrated in the accompanying drawings or their equivalents.

Referring to the accompanying drawings wherein are shown some but not necessarily the only forms of embodiment of the invention, FIG. 1 is a perspective view of a feed bunk assembly embodying a superstructure in accordance with the present invention;

FIG. 2 is a cross sectional view taken substantially along line 2—2 of FIG. 1;

FIG. 3 is a fragmentary view, in longitudinal section, taken substantially along the line 3—3 of FIG. 2;

FIG. 4 is a fragmentary view taken along line 4—4 of FIG. 3 to illustrate details of the mounting of the superstructure embodied in the feed bunk assembly of the invention;

FIG. 6 is a cross sectional view taken along line 6—6 of FIG. 5;

FIG. 7 is a view taken along line 7—7 of FIG. 6;

FIG. 8 is a fragmentary end view taken on line 8—8 of FIG. 7;

FIG. 9 is a fragmentary view like FIG. 4 illustrating a modification of the post-like supports embodied in the feed bunk assembly of FIGS. 1-8;

FIG. 10 is a fragmentary view taken on line 10—10 of FIG. 9;

FIG. 11 is a fragmentary view illustrating, in cross section, a modification of the feed bunk with reference to the base supports for the vertically projecting posts which mount its overhead superstructure.

Like parts are indicated by similar characters of reference throughout the several views.

DESCRIPTION OF PREFERRED EMBODIMENTS OF THE INVENTION

Figure 12:
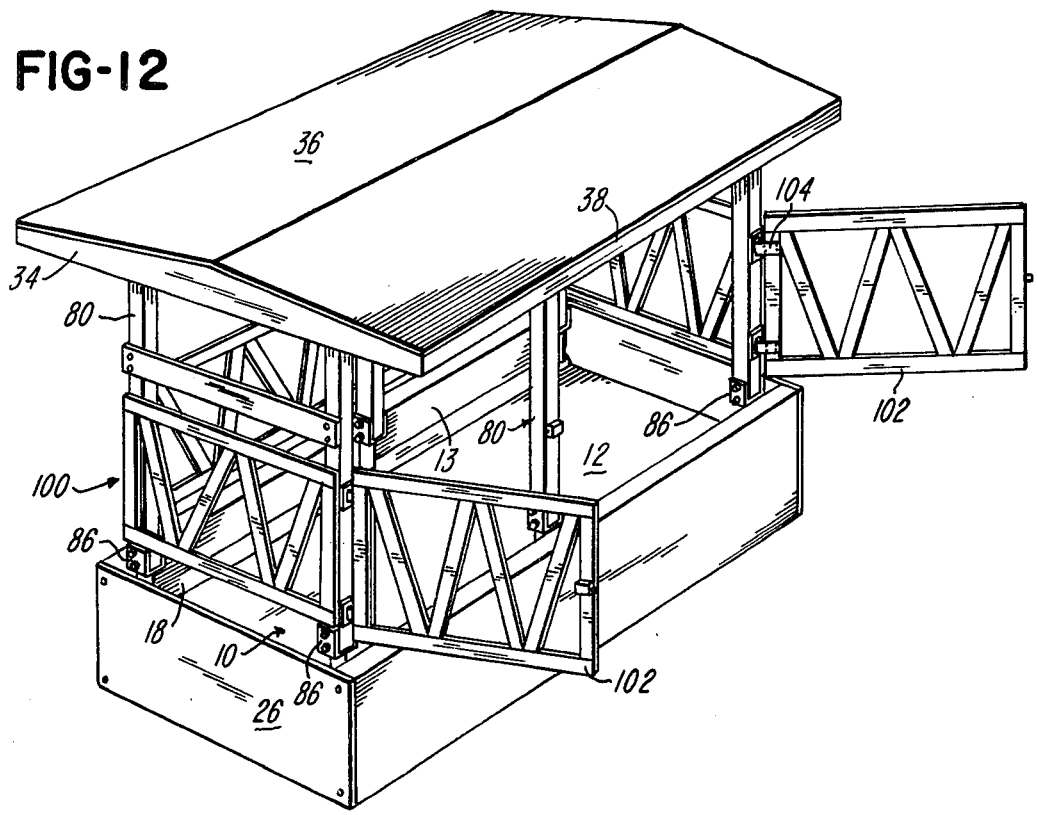
FIG. 12 is a perspective view of an embodiment of the invention which may serve as a hay feeder.

As shown in the drawings, the invention embodiments include a pre-cast concrete feed bunk 15 which is H-shaped in transverse section. As thus shaped, the uppermost portion of the feed bunk forms a feed trough 10 the base 12 of which is defined by the horizontal bar portion of the "H" and the side walls 13 and 14 by the upwardly projecting portions of the sides of the "H." The base or lower end portions 16 and 17 of the sides of the "H" seat to a ground surface G.

As shown in FIGS. 2-4 of the drawing, the lateral extremities 18 and 19 of the horizontal bar portion of the "H" are thickened in forming thereof by having their upper and lower surface diverge as they approach the side wall portions of the feed bunk. Immediately adjacent the sides of the feed bunk and within the boundaries of the side walls 13 and 14 of the trough, the portions 18 and 19 of the feed bunk are bored in a plurality of longitudinally spaced locations to form through passages 20 which are vertically oriented with reference to the ground surface G. Press fit in each of the passages 20 is a bearing sleeve 22 which has a generally cylindrical configuration and angled extremities which merge with the respective upper and lower surfaces forming the vertical extremities of the portions 18 and 19 of the feed bunk.

It is noted that the passages 20 may be formed in the feed bunk at the time of its casting or later, in a manner believed obvious. Attention is also directed to the fact that while the feed bunk has been illustrated as a pre-cast concrete structure by way of preference, the invention may be embodied in connection with feed bunks formed of different materials and in different manner.

As illustrated, and normally as originally supplied, the feed bunk 15 will be open at its ends and will most frequently form but one part of an arrangement of a plurality of feed bunks which are placed in end to end relation. As thus provided, the longitudinally aligned bunks will form a continuing feed trough from which a large number of animals may simultaneously feed. As seen, opposite ends of the assembly thus provided are preferably closed by boards or plates 26 and 27 (FIG. 1 and FIG. 3) suitably secured to the remote ends of the feed bunk assembly.

As contemplated by the invention, the feed bunk passages 20 accommodating the press fit sleeves 22 will be located in longitudinally spaced apart transversely aligned pairs. In the embodiment of FIGS. 1 through 8 of the drawings the feed bunk 15 mounts a plurality of posts 28. In each case the post 28 has a slip or sliding fit in one of the bearing sleeves 22. Accordingly, on inserting the lower end of a post 28 in a sleeve 22, the post is free to descend through the bearing sleeve and the horizontal bar portion of the H-shaped feed bunk, and within the boundaries of its inner side walls, until limited by the contact of its lower end with the ground surface G. The inner dimensions of the sleeves 22 and the outer dimensions of the posts 28 will be so designed that upon insertion in the feed bunk, as described, to have their lower ends seat to the ground surface G, the posts will project vertically to the ground surface and have a relatively long bearing contact, in each instance, with the surrounding sleeve 22.

As may be seen, therefore, the posts 28 may be simply and easily applied to the feed bunk to position in vertically projected parallel relation, in planes inwardly of the vertical side portions of the bunk. The posts 28 will be provided with laterally drilled openings for application of releasable attachment devices to further connect the posts and the side walls of the feed bunk. Such is not necessary but is provided where desired to avoid an inadvertent lifting of the superstructure which is supported by the posts. It will be noted that as mounted in slip fit relation to the feed bunk the lines of posts within the sides of the feed bunk extend in closely adjacent parallel relation to the adjacent feed bunk wall structure. This lends substantial stability thereto, enhanced by the long bearing relation of the posts 28 and the bearing sleeves 22.

As shown, the posts 28 which form mounting elements of the feed bunk superstructure have, releasably fixed thereto, interconnecting end plates or bars 29, the ends of which are bridged and continued by interconnected side rails 31. The connection of these elements to the posts and to each other may be effected by any suitable quick release connector device in a manner believed obvious. The bars 29 and rails 31 are horizontally disposed and positioned thereby in a generally parallel relation to ground surface G and in a spaced elevated relation to the feed bunk 15. It will be obvious, of course, that the side rails may be formed in segments of varying length, placed in end abutting aligned relation. In any case, the purposes of the mounting of the bars and rails 29 and 31 are two-fold. They peripherally contain the posts and reinforce the stable mount of the superstructure of which they form a part. Moreover, they provide guards which limit and control the access of animals to the feed which is delivered to the trough 10 in a manner to be further described.

The upper ends of the posts 28 mount a roof means including beams 34. The beams 34 are connected to bridge the transversely spaced upper ends of transversely aligned posts and are secured to the posts by releasable connector means such as bolts and nuts 41. Note in FIG. 2 of the drawings that the ends of the beams 34 are extended so as to project beyond the sides of the feed bunk 15, in spaced elevated relation thereto. The upper edge portions of the beams 34 have a generally triangular configuration the apex of which is uppermost and centered. Fixed to overlie the uppermost edge portions of the beams 34 are roof panels 36. The latter are thereby positioned to form an overhanging, shielding, protective cover for the animals which feed from the trough 10. The roof structure so provided is completed by side plates or panels 38 which are connected to bridge the projected extremities of the beams 34.

As may be readily seen from the foregoing, the superstructure mounted over the feed bunk or bunks 15 is essentially an easily dismembered portable package. Particularly where the roof structure is segmented so as to form a cover for an individual feed bunk, complete sections of the superstructure may be easily lifted and readily transported as a unit to another location without disassembly. Further, whether the superstructure is fully disassembled or removed as a completely assembled unit, the whole is facilitated by the slip fit relation of the base portions of the posts 28 with reference to the feed bunk. Even if the user exercises the option to provide a releasable connector between the posts and the feed bunk per se, the removal of such connectors may be quickly and easily effected and the time and effort involved does not in any sense limit the portability of the superstructure or the simplicity of the structure by which it may be mounted to and stabilized by the feed bunk per se. An important feature of the invention as above described is the fact that the posts 28 are so installed as to lie within the outline of the trough 10 and they are so located that they do not interfere with a free and orderly movement of animals to opposite sides of the feed bunk. The position of the posts and the mount thereof is such that there is little likelihood they will be damaged by the animals, either during feeding or in the course of their movement to and from the feed bunk. If damage should inadvertently occur, the repair and maintenance will obviously be of a minimal nature and involve minimal cost. Such repair and maintenance will certainly not interfere with a free and continued use of the feed bunks.

Figure 5:
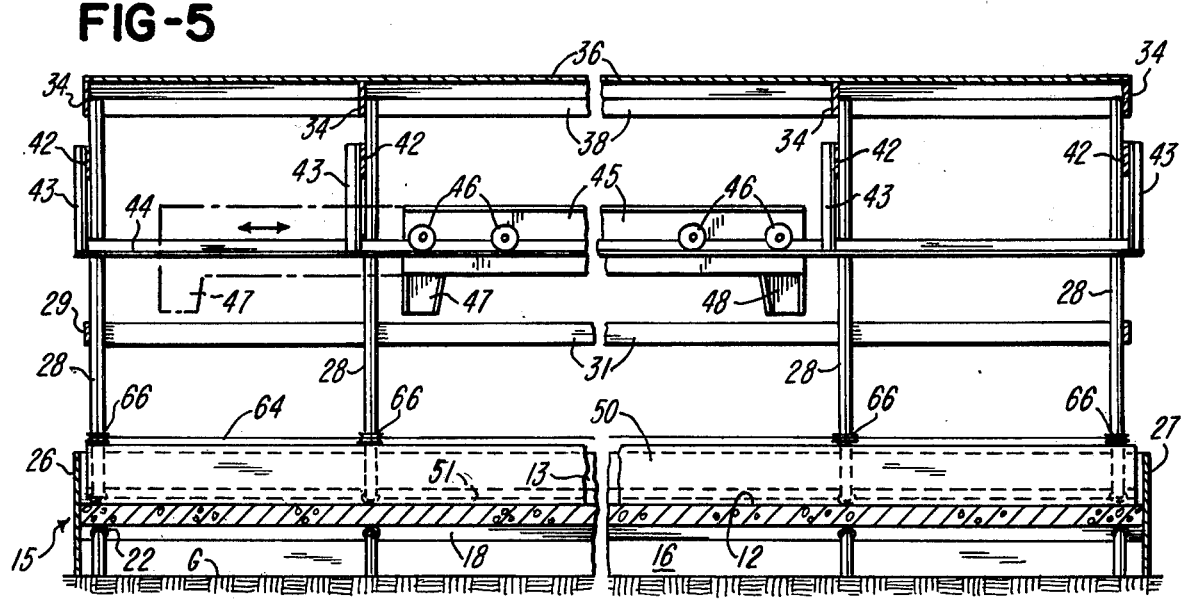
FIG. 5 is a view like FIG. 3, expanded to include additional detail and to illustrate inclusion of an overhead feeder device for dropping feed into the feed bunk.

FIGS. 5 through 7 illustrate other features of a preferred embodiment of the invention. As shown, at a level adjacent and spaced from the upper ends of the posts 28 which are releasably connected with the roof beams 34, the transversely aligned pairs of posts are transversely bridged by releasably connected horizontally orienting cross bars 42. Connected to each cross bar 42 is a pair of transversely spaced carrier beams 43. The beams 43 are positioned in lines which extend the length of the superstructure, which lines are parallel to each other and equidistantly spaced from the adjacent lines of posts 28. Fixed to the dependent extremities of each line of beams 43 is a horizontal longitudinally extending rail 44. The rails 44 are shown positioned in spaced elevated relation to the level of the bars 29 and rails 31 and to support wheels 46 which provide the base of a trough-like, longitudinally extended feeder device 45. Opposite ends of the trough defined by the feeder 45 have openings which are respectively rimmed by downwardly projecting feed spouts 47 and 48. These spouts serve as the means by which feed introduced to the feeder 45 may be dropped to the trough 10 of the feed bunk 15 as the feeder moves from end to end of the rails 44.

It should be understood that the mechanical feeder device here illustrated is known apparatus which is normally provided with controls enabling it to self propel from end to end of the rails 44. It may be loaded from a continuous conveyor in connection with a silo or like structure.

It will be understood that the bars 42 and carrier beams 43 will be connected to the posts 28 and to each other by releasable connector devices of any commonly known type which will suit the particular application.

The unique structure of the invention embodied in the trough 10 and associated with the overhead feeder 45 is illustrated in FIGS. 6 and 7 of the drawings. As there seen, embodied to have its lower edge centered between the side walls 13 and 14 of the trough 10 and to extend the length of the feed bunk assembly, is a longitudinally extended plate 50. As diagrammatically shown, the lower edge of the plate 50 is connected to the base 12 of the trough 10 by suitable hinge means 51. The opposite edge of the plate 50, which projects upwardly from the base 12, is provided with one anchoring device 54 at its longitudinal center and a further anchoring device 56 at the end thereof remote from a winch 58 mounted to one end of the feed bunk assembly. As may be seen in FIG. 7 and FIG. 8, the drum or drive shaft 60 of the winch 58 has its axis of rotation oriented in a sense generally perpendicular to the ground G and centered between the sides of the feed bunk 15 to which it is connected. The winch 58 is arranged to be reversibly driven by a suitably interconnected motor 62. Since the drive and the connection afforded therein forms no particular part of the present invention, the details thereof are not further described. Such details are clearly within the knowledge of one versed in this particular art.

Referring to FIG. 8, the winch 58 mounts a first cable 64 one end of which is wrapped about and anchored to the drum 60 and the opposite end of which is extended laterally and then directed down one side of the bunk structure in a line closely adjacent the side wall 13, within and parallel to the line of posts 28 at that side. The posts 28 mount pulley wheels 66 over which the cable 64 is threaded. As the cable 64 reaches the pulley wheel 66 in connection with the last post in the line, it is turned around the wheel and extended inwardly of the bunk where it is anchored to the connector device 56.

A secondary cable segment 65 has one end thereof connected to the cable device 64, at a point in its length along the side of the feed bunk assembly which lies between the winch 58 and a midpoint of the bunk. The opposite end of the cable segment 65 is anchored to the connector device 54. Intermediate its length, the cable segment 65 extends about a pulley 67 from which it is laterally extended to the connector device 54.

As seen in FIG. 7, the controls provided for the plate 50 include a second cable 70 one end of which is wrapped about and anchored to the drum 60. The cable 70 extends from the drum 60, first in a sense opposite to the laterally directed portion of the cable 64, following which it is then directed in a line closely adjacent the side wall 14, within and parallel to the line of posts 28 at that side of the feed bunk. This line of posts also mounts pulley wheels, identified by numerals 71, over which the cable 70 is threaded. As the cable 70 reaches the pulley wheel 71 in connection with the last post in this line, it is turned around this wheel and directed inwardly of the bunk where it is anchored to the connector device 56. A cable segment 72 has one end thereof anchored to the cable 70 at a point in its length which is in general transverse alignment with the point of connection of the cable segment 65 to the cable 64 at a time when the plate 50 is oriented generally perpendicular to the base 12 of the trough 10. The opposite end of the cable segment 72 is anchored to the connector device 54. Intermediate its length the cable segment 72 is directed about a pulley 73 on a post 28 which is in generally transverse alignment with the pulley 67 on the opposite side of the feed bunk.

As may be readily seen from the foregoing, when the winch 58 is energized to rotate its drum, depending on the direction of rotation, one of the cables 64 and 70 will be wrapped on to the drum 60 as the other is paid out. As a result of this operation, it will be seen that the plate 50 may be selectively pivoted about its hinges 51, in one direction or another and to the extent desired, to produce an inclination thereof to the base 12 of the trough 10. As will be seen, the inclination of plate 50 will so orient it with reference to the feed spouts of the overhead device 45 as to direct the feed which drops to a selected side portion of the trough 10. It will be understood, of course, that the configuration of the plate 50 can be modified so as to provide relatively angled portions so that the plate 50 can function, in a particular position, to direct feed to selected areas of both sides of the feed trough 10.

FIG. 9 of the drawings illustrates a modification of the posts 28 contemplated by the present invention. As here illustrated, the posts 28 may be fabricated in two parts including an upper portion 80, which may, for example, be a 4 × 4 inches wooden beam, and a lower or base portion 82. In this case the latter is comprised of a pipe-like structure 84 the upper end of which has an integrally connected U-shaped saddle 86 which nests the lower end of the beam 82. The sides of the saddle and the nested portion of the beam include aligned apertures providing for the application of bolts 88 and nuts 89 in an obvious manner. The elements of the post are thereby integrated whereupon the lower or base portion thereof, identified by the numeral 82, may be slip fit into a sleeve 22 and have the same relation to a feed bunk as a post 28 such as first described.

FIG. 11 of the drawings illustrates a modification of the feed bunk 15 in accordance with another concept of the invention for effecting the mount of its superstructure. In this case, in the casting of the feed bunk a series of metal rods 90 is incorporated to project vertically from each of its side walls which orient generally perpendicular to ground surface G. Further incorporated in the feed bunk and in connection with each of the rods 90 is a laterally projected reinforcing rod 96. In casting the rods 96 are embodied the horizontal bar portion of the bunk. In this modification of the invention the elements 90 will serve as the lower ends of the posts or post assemblies which support roof beams 34. For this purpose the projected ends 92 of the rods 90 are threaded so vertically projected post units may have their lower ends placed in threaded engagement therewith, to form axial extensions thereof. In this case, also, the rods 90 and their axial extensions are positioned in lines inset from the lateral limits of the feed bunk and will mount a superstructure such as previously described.

FIG. 12 illustrates a further feed bunk assembly which may function as a hay feeder. To the extent that details of the feed bunk and its superstructure have been previously described, they are not here repeated since like parts are identified by like numerals in the drawings. There should be no doubt, from the drawings, as to the structure intended. The only differences in this instance is that a single feed bunk is used and the posts 80 which form the base of the superstructure are surrounded by a feeding fence 100 which includes apertures through which animals may feed. This fence is fixed along one side and to either end of the posts 80 by releasable connectors. The fence structure at the fourth side of the posts is comprised of a pair of sections 102 connected to the remote or end posts 80 at that side by hinge members 104. The provision for hinged fence sections 102 enables the fourth side of the fence to be opened to provide access for loading large bales of hay or other feed in the trough 10 by means of a tractor or fork lift truck.

The structure of the illustrated embodiments has in many instances been shown schematically or diagrammatically and only such details are evidenced as may be necessary for an understanding of the structure to be effected by one versed in the art. Moreover, various embodiments other than those illustrated are comprehended by the invention and the attached claims.

Particular attention is directed to the fact that though the posts 28 and base post segments 84 are shown as cylindrically shaped, such is not to be construed as limiting since the post elements, at least as to base portions, may be formed, for example, of 2 × 4 inch or 4 × 4 inch posts which are rectangular in cross sectional configuration and fabricated of wood, in which event the passages accommodating the same will be complementarily shaped. Also in the event the material of the trough and the posts so permit, the sleeves such as 22 will not be necessary. Nor, while preferred, is it required for certain applications that the base of the trough 10 be thickened adjacent its sides.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Feed bunk apparatus having an upper side and an under side, the upper side of which includes means defining a trough having a base feeding surface merging at its margins with upwardly projecting walls and the under side of which includes surface portions for seating thereof to a ground surface, post means including portions installed in said means defining a trough to one side of and immediately adjacent said upwardly projected walls, said post means being positioned and stabilized thereby to project upwardly from said base feeding surface, said installed portions of said post means being characterized by a slip fit mount in said means defining a trough and, upwardly of said installed portions thereof, said post means being adapted to mount a superstructure in an elevated relation to said trough.

2. Feed bunk apparatus according to claim 1 characterized by said trough being formed with passages positioned in an immediately adjacent relation to said upwardly projecting walls, through which passages said installed portions of said post means are slip fit to have their lowermost extremities seat on the ground surface which underlies said means defining a trough.

3. Feed bunk apparatus as in claim 1 characterized by said post means each comprising releasably connected vertically stacked post segments, the lowermost of which is slip fit to seat inwardly of the outer limits of said walls and to project upwardly therefrom to terminate in the vicinity of the upper limits of said upwardly projecting walls, the upper end of said lowermost of the releasably connected post segments and the lowermost end of the adjacent releasably connected post segment being interconnected by means providing that a portion of one thereof is laterally contained by a portion of the other.

4. Feed bunk apparatus according to claim 3 characterized by the uppermost ends of the lowermost post segments each including a saddle in which upper portions of said post segments are seated and secured by releasable connectors.

5. Apparatus as in claim 1 characterized by said means defining a trough being bored for insertion therein of the installed portions of said post means, the walls of said bores accommodating and providing a long bearing for said post means to establish the same in a stable upwardly projected relation with reference to the means defining said trough.

6. Feed bunk apparatus as in claim 1 characterized by partition means hinged to said base feeding surface in said trough and said means defining a trough having in connection therewith means for selectively adjusting the position of said partition means to direct a flow of feed from an overhead feeder to a selected area of said feed trough.

7. Feed bunk apparatus according to claim 1, wherein said base feeding surface is part of a horizontal trough portion, margins of which are defined by said upwardly projecting walls, said horizontal trough portion having means defining apertures adjacent to said upwardly projecting walls receiving and vertically orienting the installed portions of said post means, said trough having feet seating on and elevating said horizontal trough portion with respect to a feed bunk supporting surface, said installed portions of said post means extending through said apertures and below said horizontal trough portion to rest on the feed bunk supporting surface.

8. Feed bunk apparatus according to claim 7, wherein said post means rise through and beyond said horizontal trough portion and above an upper level of said upwardly projecting side walls and mount a superstructure which is fastened directly thereto.

9. Feed bunk apparatus according to claim 7, wherein said means defining a trough is a unitary member which is H-shaped in transverse section, the cross bar of said member defining said horizontal trough portion and upper and lower vertical portions of said member defining respectively said upwardly projecting walls and said feet.

10. Feed bunk apparatus according to claim 9, characterized by a divider received in said H-shaped member between the upper portions of said walls, orienting in a sense substantially parallel thereto, means mounting said divider for rocking motion to incline toward either of said upper portions of said walls, and means for effecting rocking motion of said divider.

11. Feed bunk apparatus having an upper side and a lower side the upper side of which includes means defining a trough having a base feeding surface merging at its margins with upwardly projecting walls and the under side of which includes surface portions for seating thereof to a ground surface, post means having a slip fit releasable connection with said means defining a trough and mounting in connection therewith means defining a containing enclosure, said enclosure forming a substantially continuous wall structure forming a feeding fence about the trough through which animals may feed, elements of which wall structure are displaceable to provide access for loading the trough with large bales of hay or other feed material.

12. Feed bunk apparatus including means defining a trough which is "H" shaped in transverse section, said "H" shape having an upper portion and a lower portion, the upper portion of said "H" providing said trough, the lower portion of said "H" providing a base for said trough and adapting said apparatus to seat directly to a ground surface and the bar portion of said "H" having a series of apertures therein adjacent its lateral extremities, and post means having portions received in said apertures, said post means being free of connection with said apparatus and positioned and maintained thereby to project upwardly therefrom and being adapted to mount a superstructure in an elevated relation to said trough.

13. Feed bunk apparatus as in claim 12 characterized by the lateral extremities of said bar portion being relatively thickened in a vertical sense and embodying therein said apertures, and bearing sleeves in said apertures providing for a slip fit therein of the installed portions of said post means.

14. Feed bunk apparatus having an upper side and an under side the upper side of which includes means defining a trough having a base feeding surface merging at its side margins with upwardly projecting walls and having through passages accommodating the slip fit insertion of post elements to stably mount said elements, by virtue of their insertion, in a vertically projected relation to said trough, said trough being H-shaped in cross section and said passages being incorporated in the horizontal bar portion of the H shape to position said post elements to project upwardly from said trough in closely adjacent relation to inner surface portions of the said upwardly projecting walls.

15. Feed bunk apparatus having an upper side and an under side the upper side of which includes means defining a trough having a base feeding surface merging at its side margins with upwardly projecting side walls and the under side of which includes surface portions for seating thereof to a ground surface, said means embodying, within the limits of the outer surfaces of said side walls, means for receiving and mounting post-like structures in a slip fit relation therewith, said means defining said trough being formed to position said post-like structures, by virtue of their slip fit, in a vertically projected relation to said trough.

16. Feed bunk apparatus as in claim 15 characterized in that said means for receiving and mounting post-like structures are provided by means defining vertically oriented passageways formed in said trough, said passageways being formed to confine therein lower portions of such post-like structures as may be applied to said trough to establish applied post-like structures in a stable vertically projected relation to said trough and within the boundaries thereof.

17. Feed bunk apparatus as in claim 16 characterized in that said passageways are located within and longitudinally spaced in immediately adjacent relation to and along the inner limits of said side walls of said trough.

18. Feed bunk apparatus as in claim 16 wherein said base feeding surface and said side walls are configured to provide at the upper portion of said trough a generally U-shaped configuration.

19. Feed bunk apparatus as in claim 15 characterized in that divider means are connected in pivotal relation to and to project upwardly from said base feeding surface in a position intermediate said side walls, said divider means have a plate-like configuration and are adapted to be inclined in the direction of one or the other of said side walls to provide directional influence on feed being dropped from an overhead feeder to direct it towards one side wall of said feed trough or the other.

* * * * *